Nov. 20, 1956 L. LIFTON 2,771,166
HANDLES FOR BRIEF CASES AND LUGGAGE
Filed Aug. 2, 1954 6 Sheets-Sheet 1

*Lewis Lifton*
INVENTOR.

BY

ATTORNEY

Nov. 20, 1956  L. LIFTON  2,771,166
HANDLES FOR BRIEF CASES AND LUGGAGE
Filed Aug. 2, 1954  6 Sheets-Sheet 2

INVENTOR.
Lewis Lifton
BY
Cm Palmer
ATTORNEY Nov. 20, 1956 L. LIFTON 2,771,166
HANDLES FOR BRIEF CASES AND LUGGAGE
Filed Aug. 2, 1954 6 Sheets-Sheet 3

INVENTOR.
Lewis Lifton
BY
ATTORNEY

Nov. 20, 1956  L. LIFTON  2,771,166
HANDLES FOR BRIEF CASES AND LUGGAGE
Filed Aug. 2, 1954  6 Sheets-Sheet 6

Lewis Lifton
INVENTOR.

BY
C. M. Palmer
ATTORNEY

United States Patent Office 2,771,166
Patented Nov. 20, 1956

2,771,166

HANDLES FOR BRIEF CASES AND LUGGAGE

Lewis Lifton, New York, N. Y.

Application August 2, 1954, Serial No. 447,174

16 Claims. (Cl. 190—57)

The subject matter of this invention is concerned with an improved handle adapted to be conveniently mounted on brief cases or luggage. More particularly, the invention is directed to a suitably covered externally convexed and internally concaved foldable one piece ring shaped member embodying complementary components or ring sections carrying transversely arranged complementary locking means for automatically securing the components in juxtaposition when the ring shaped member is folded. One object of the invention resides in the provision of a ring shaped member of the type referred to which serves as the body of the handle and which comprises bridge means integral with the components and overhanging the latter but adapted to be folded and effectively stayed therein and transversely thereof to characterize positive means carrying complementary locking elements for adequately holding the components closed and in juxtaposition. Another object is concerned with the provision of a foldable ring shaped member having means for staying the locking element carrying means within the complementary components or complements and transversely thereof prior to folding of the ring shaped member. Another object comprehends the provision of a new article of manufacture for a handle, comprising; a one piece substantially ring shaped member embodying a pair of ring components or sections having spaced exteriorly convexed surfaces and spaced internally concaved surfaces and wherein spaced web means are intermediate and merge these sections and wherein bridge means is integral with and extends laterally from the upper margin of one of said sections but is adapted to be folded substantially at the confluence of the bridge means with the last mentioned section but within the latter to be disposed transversely thereof and whereby stay means acts on the bridge means when disposed transversely of said last mentioned section to preclude removal therefrom, the bridge means serving as keeper means, for reception of a complementary fastening element, such as, a threaded member carried by similar bridge means of the companion ring section of the pair, or for reception of a complementary fastening element adequately anchored to the companion ring section independent of any bridge means. Other important objects and functional and structural features of the invention will appear from the following detailed description taken from the accompanying drawings wherein:

Figure 1:
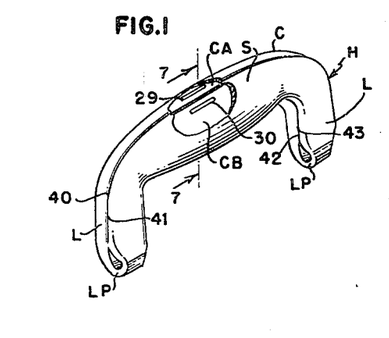
Fig. 1 is a perspective view of the internally locked handle, illustrating one embodiment according to the invention, however, showing the covering partly broken away.
Figure 2:
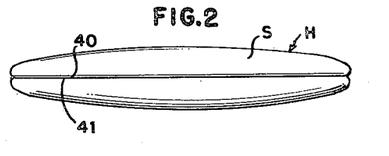
Fig. 2 is a plan view of Fig. 1.
Figure 3:
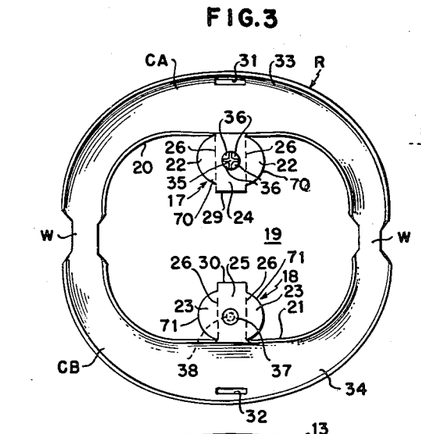
Fig. 3 is a plan view of the concavo-convex sheet metal ring, showing the bridge means of the foldable complements of the ring unfolded.
Figure 4:
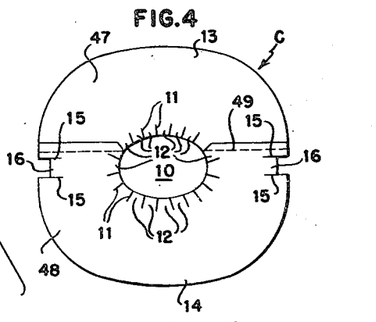
Fig. 4 is a plan view of the flexible cover or blank on which the ring is secured after the bridge means thereof have been folded into the respective components of the ring.
Figure 5:
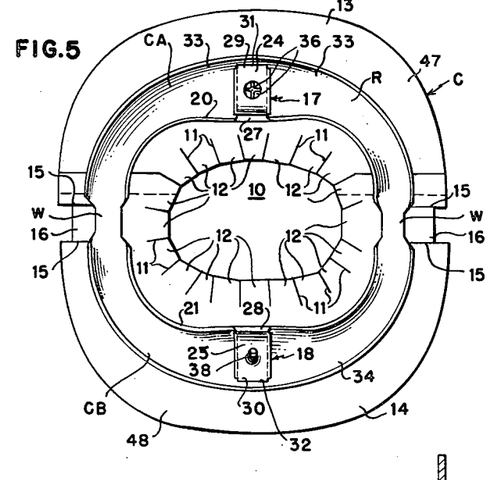
Fig. 5 is a plan view showing the bridge means of the ring locked within the respective complements thereof and also illustrating the ring mounted on the covering preparatory to adhesively securing the covering or wrapper to the ring.

Illustrative of the embodiments disclosed, handle H comprises spaced limbs L and the intervening hand gripping span S. Limbs L terminate in spaced loops LP adapted to be appropriately swingably mounted on a brief case or a piece of luggage as is well understood. Broadly speaking, handle L comprises the sheet metal ring shaped member R (Fig. 3) and the flexible cover or wrapper C (Fig. 4). Ring R constitutes the body of the handle and is internally concaved and exteriorly convex. In fact, ring R is a one piece member having spaced and flat webs W integrally merged with the concavo-convex complements or complementary components CA and CB of ring R.

Cover C is preferably of leather but may be of a suitable flexible fabric or plastic on which the ring is initially positioned prior to securing the cover to the ring. The cover is provided with a central opening 10 defined by the inner slitted margin, that is kerfs 11 interrupting the inner margin of wrapper or cover C and lead to opening 10. Thus a plurality of lips 12 are provided, adapted to be folded over and against the inner margin of ring R and against the inner concaved surfaces of components CA and CB.

The outer margins 13 and 14 of cover C are interrupted by slits 15 characterizing lips 16 adapted to be folded over and secured to wings W and lips 12. However, outer margins 13 and 14 are folded against the outer margins of complements CA and CB and turned into the respective channels or concavities thereof and secured to the inner faces thereof and to the bridge means broadly designated 17 and 18 of components CA and CB of ring R respectively.

When stamped out with ring R but before folding, bridges 17 and 18 extend into opening 19 defined by ring R and are integral with the most upper portion of inner margins 20 and 21 of components CA and CB to inwardly overhand the latter. Also bridge 17 embodies the spaced wings 22 while the bridge 18 includes similar laterally extending wings or ears 23.

Figure 3A:
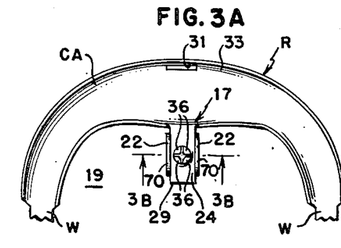
Fig. 3A is a fragmentary view of Fig. 3 but exhibiting the wings of the bridge means turned upwardly.
Figure 3B:
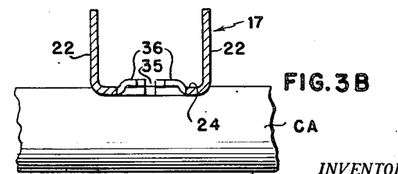
Fig. 3B is an enlarged sectional view on the line 3B—3B of Fig. 3A.
Figure 7:
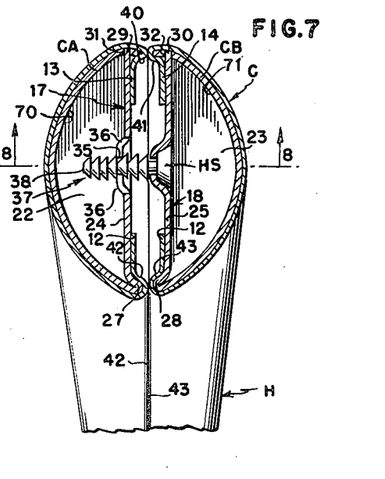
Fig. 7 is an enlarged transverse sectional view on the line 7—7 of Fig. 1.
Figure 8:
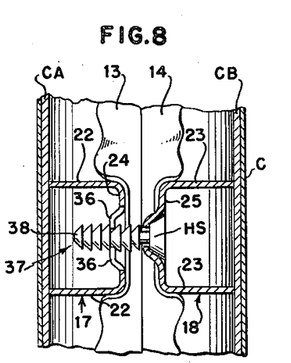
Fig. 8 is a sectional view on the line 8—8 of Fig. 7.
Figure 9:
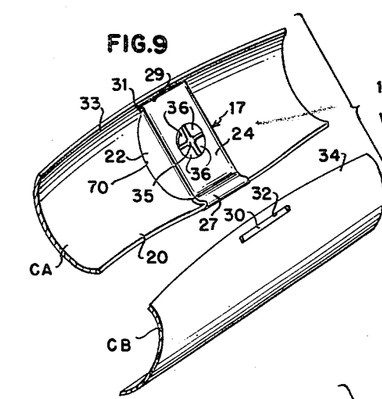
Figs. 9 and 10 are exploded fragmentary perspective views of the complementary components of the handle, showing the bridge means transversely spanning and locked within the interior grooves or channels of the complementary components or ring sections.
Figure 10:
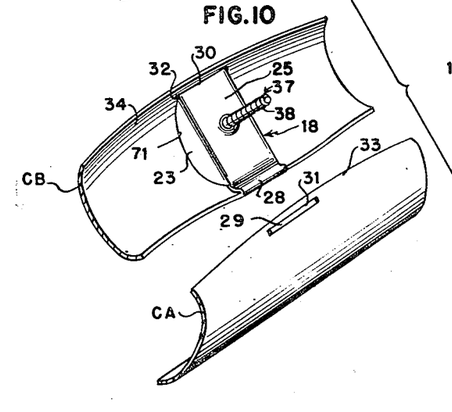

Before completely adhesively securing cover or wrapper C to the convex faces of the ring and within and against the margins of the concaved surfaces of companion complements or ring sections CA and CB thereof, bridges 17 and 18 have their ears 22 and 23 bent upwardly along dotted lines 26 (Fig. 3) relative to their medial portions 24 and 25 of respective bridges to assume the position as shown in Figs. 3A and 3B. Thereafter, these medial portions 24 and 25 are swung upwardly, that is, folded adjacent and along their confluence with their respective ring sections and then swung downwardly into complements or ring sections CA and CB, thus forming substantially at such confluences with the inner margins 20 and 21 of these complements, the folds 27 and 28 (Figs. 7, 9 and 10). The rounded peripheral faces 70 and 71 of ears 22 and 23 of bridges 17 and 18 are complementary to the inner concaved faces of ring sections CA and CB and cooperate with such faces to limit downward turning or folding of the bridges therein at which time free terminals 29 and 30 of bridges 17 and 18 snap in to and are received by slots 31 and 32 in outer margins 33 and 34 of ring sections CA and CB. Consequently, bridges 17 and 18 are effectively stayed to preclude sagging. By the present arrangement, it is evident that bridges 17 and 18 are positively retained below the spaced inner and outer margins of the companion complements CA and CB, that is, the intervening portions 24 and 25 of bridges 17 and 18 lay totally within and transversely of complements or components CA and CB.

However, it should be realized that; one, preparatory to folding wings 22 and 23 of bridges 17 and 18 and preparatory to bending the latter to be arranged within complements CA and CB, intervening member 24 of bridge 17 is provided with a counter sunk or punched out central portion defining opening 35 and the spaced tapered and offset resilient lips 36; and two, head HS of threaded member, broadly designated 37 is appropriately fixedly anchored to intervening member 25 of complement CB.

Figure 6:
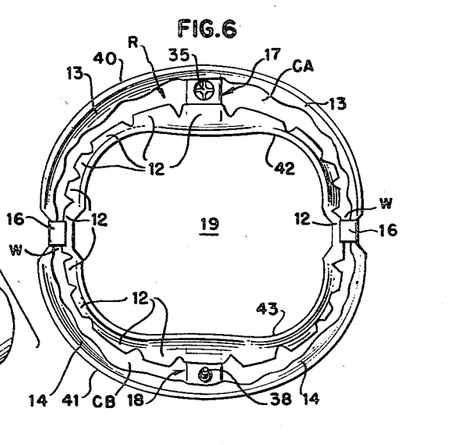
Fig. 6 is a plan view showing the inner and outer margins of the covering folded or wrapped about the inner and outer margins of the ring and effectively secured thereto and to the bridge means.

With bridges 17 and 18 retained or stayed within components CA and CB, covering C is adhesively secured to the convex faces of these complements. Thereafter the split inner margin defined by lips 12 and outer margins 13 and 14 of cover C are folded over and adhesively secured against the inner and outer margins respectively of these complements and against bridges 17 and 18 as shown in Fig. 6. Subsequently, lips 16 of cover C are turned inwardly and adhesively secured against the inside faces of webs W of ring R.

The covered ring is now folded along the covered webs W, that is, covered complements CA and CB are bent towards each other whereby threaded shank 38 of the anchored member 37 meets the resilient and spaced lips 36, to deflect and snap by the latter in its travel through aperture or opening 35 until the upper covered rim faces 40 and 41 of components CA and CB meet at which time the lower rim faces 42 and 43 meet.

By reason of the fastening means defined by lips 36 carried by bridge 17 and the threaded member 37 carried by bridge 18, complements CA and CB are held closed and locked against separation. In such relation, the locking means is concealed within the handle.

For purposes of disclosure, bridge 17 may be considered as keeper means for retaining threaded shank 38 against accidental slippage.

With threaded member 37 within opening or hole 35 complements CA and CB are locked automatically on the completion of the closing action.

Preferably cover C comprises complementary overlapped sections 47 and 48 appropriately secured by the line of stitching 49 (Fig. 4).

Figure 11:
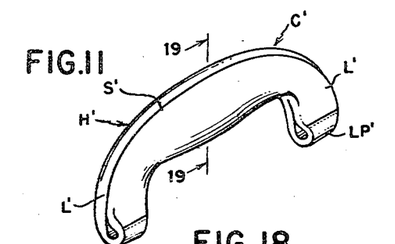
Fig. 11 is a perspective view of a handle according to another form of the invention.
Figure 12:
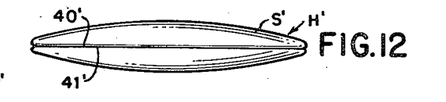
Fig. 12 is a plan view of Fig. 11.
Figures 13, 19, 20, 21, 22:
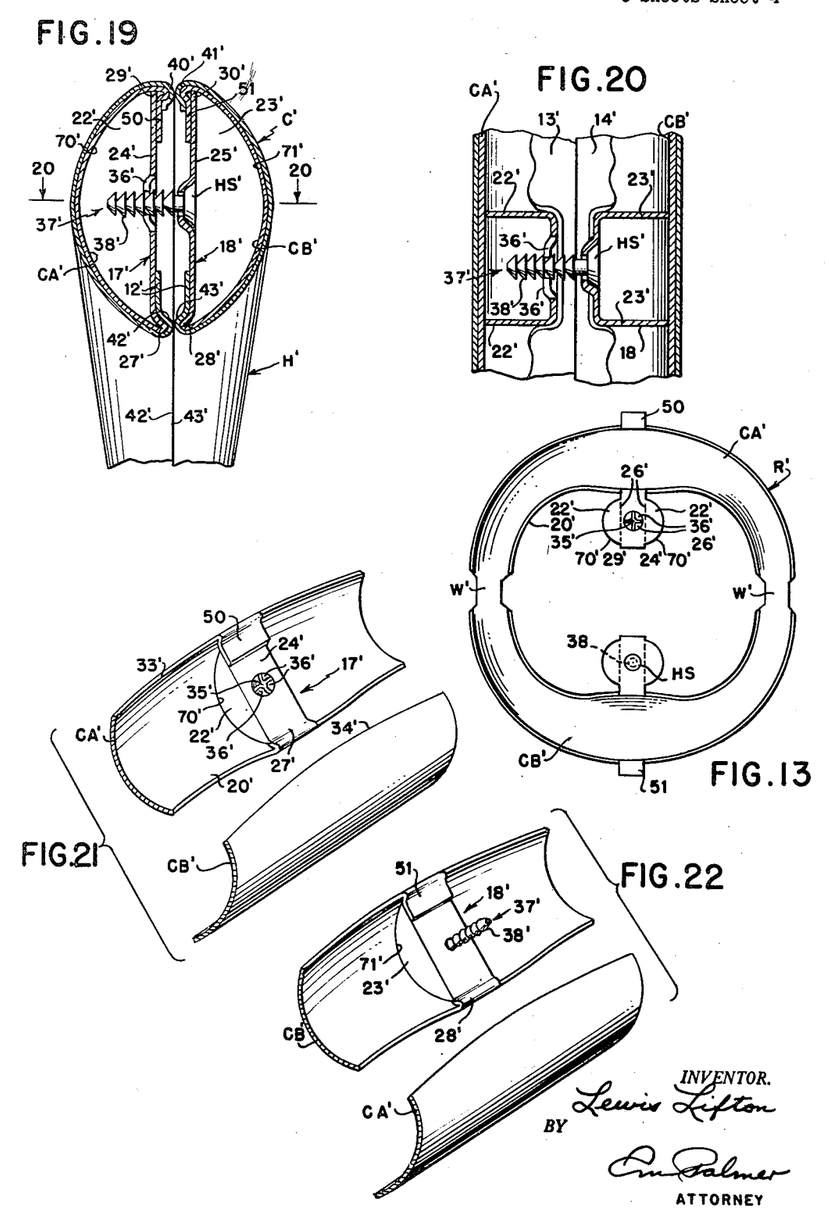
Fig. 13 is a plan view of the concavo-convex sheet metal ring showing the oppositely arranged bridge means of each complement of the ring unfolded.
Fig. 19 is an enlarged transverse sectional view on the line 19—19 of Fig. 11.
Fig. 20 is a sectional view on the line 20—20 of Fig. 19.
Figs. 21 and 22 are fragmentary exploded views of the complements of the ring showing the manner of securing the bridge means therein.
Figure 14:
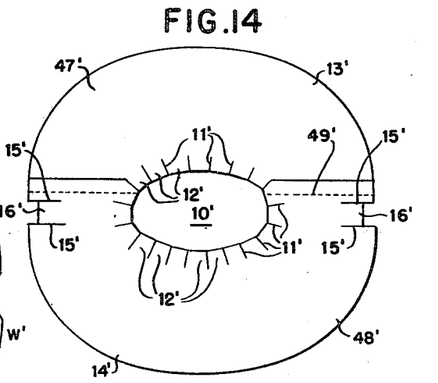
Fig. 14 is a plan view of the blank or covering for the ring.
Figure 15:
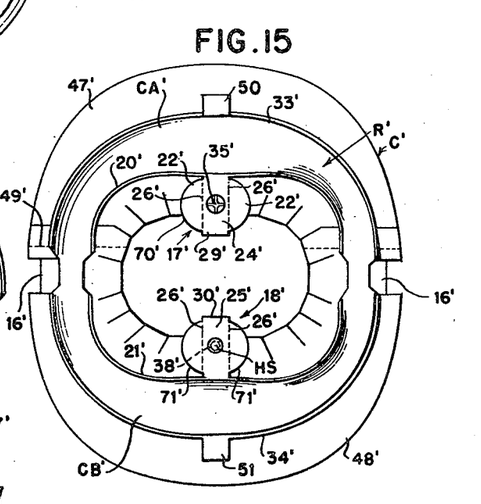
Fig. 15 is a plan view showing the ring mounted on the covering and with the bridge means thereof unfolded and with the covering unwrapped from the ring.
Figure 16:
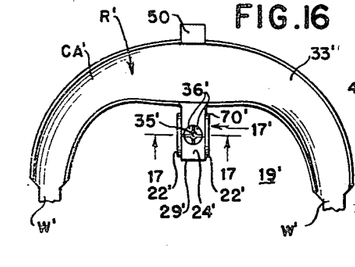
Fig. 16 is a fragmentary view of Fig. 13 showing the wings of the bridge means bent up prior to turning or folding the bridge means into the ring.
Figure 17:
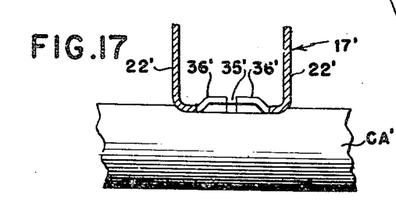
Fig. 17 is an enlarged sectional view on the line 17—17 of Fig. 16.
Figure 18:
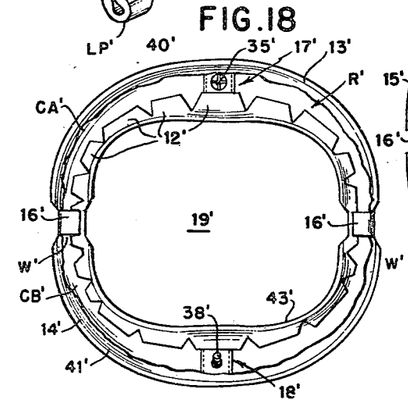
Fig. 18 is a plan view of the covered ring prior to folding or bending thereof to form the handle shown in Fig. 11.
Figures 23, 24, 25, 26, 27:
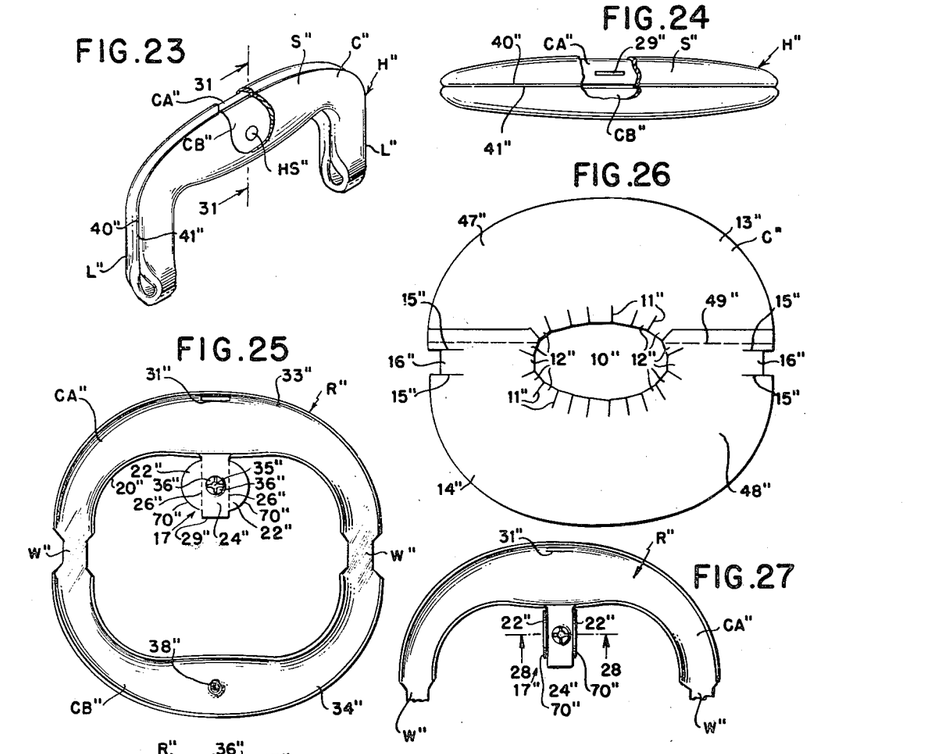
Fig. 23 is a perspective view of a handle according to another embodiment of the invention, shown partly broken away.
Fig. 24 is a plan view of Fig. 23
Fig. 25 is a plan view of the sheet metal ring of the handle.
Fig. 26 is a plan view of the flexible cover for the ring.
Fig. 27 is a fragmentary view of Fig. 25 but showing the wings of the bridge means folded upwardly.
Figures 28, 29, 30:
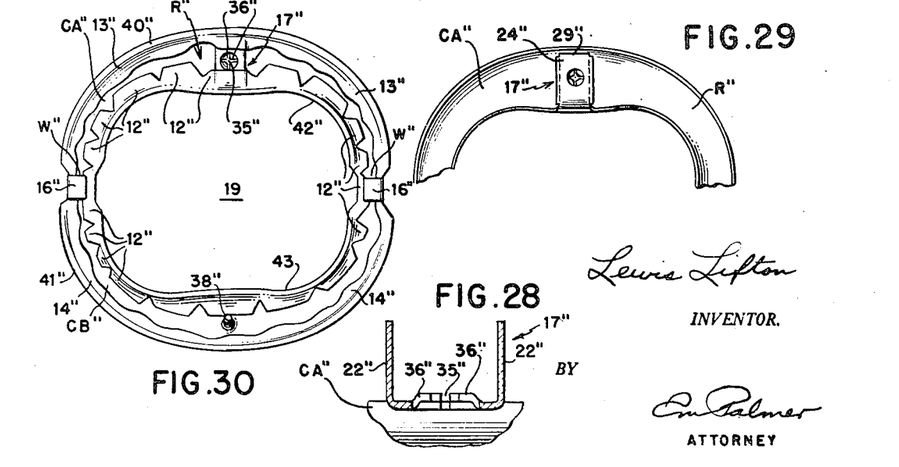
Fig. 28 is an enlarged sectional view on the line 28—28 of Fig. 27.
Fig. 29 is a view similar to Fig. 27 but showing bridge means turned into its respective complement of the ring and locked.
Fig. 30 is a plan view illustrating the assembled and secured relation of the cover and ring but with the latter awaiting to be folded and locked to constitute the handle shown in Fig. 23.
Figure 31:
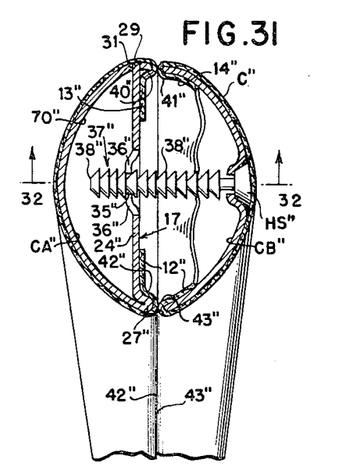
Fig. 31 is an enlarged sectional view on the line 31—31 of Fig. 23.
Figure 32:
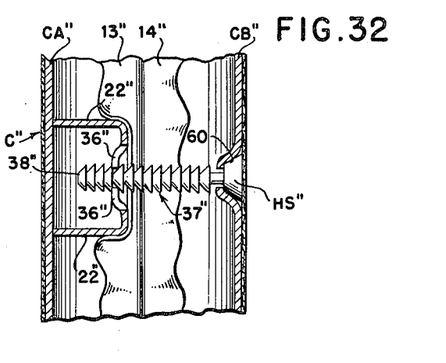
Fig. 32 is a sectional view on the line 32—32 of Fig. 31.
Figure 33:
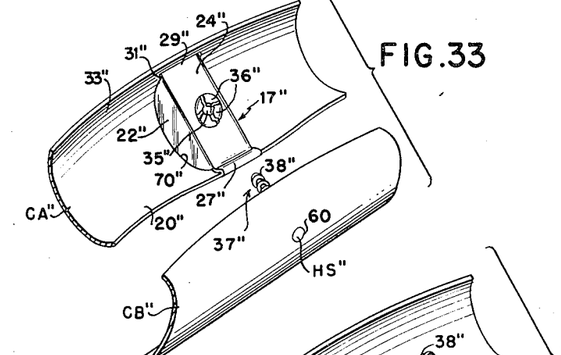
Figs. 33 and 34 are enlarged fragmentary and exploded views of the complementary components of the handle.
Figure 34:
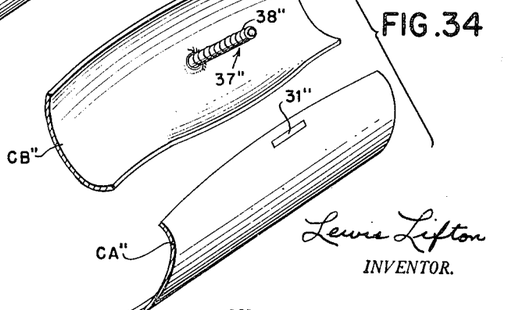

In Figs. 11–22, parts similar to those shown in Figs. 1–10 have been primed and it should be observed that slots 31 and 32 interrupting complements CA and CB of ring R as disclosed in connection with Figs. 1–10, have been eliminated. Instead, in Figs. 11–22, bridges 17' and 18' are held in place by inwardly turned lugs 50 and 51, for example to stay depending ears 22' and 23' against the concaved faces of complements or ring sections CA' and CB' and against displacement out of the respective complements. Lugs 50 and 51 are integral with and outwardly overhanging the uppermost portion of the outer margins 33' and 34' and consequently extend laterally and outside of respective complements CA' and CB'. After bridge members 17' and 18' are positioned within the complements, lugs 50 and 51 are turned and bent inwardly and against bridges 17' and 18' to stay the latter firmly in place. In other aspects, the form according to Figs. 11–12 is along the lines of the embodiment according to Figs. 1–10 inclusive.

In the form according to Figs. 23 to 34 inclusive parts similar to those illustrated in embodiment of Figs. 1–10 have been double primed and the form in Figs. 23 to 34 is along the lines of the embodiment illustrated in Figs. 1–10 except that bridge 18 with its ears 23 have been removed. Also slot 32 has been removed. Instead threaded member 37" is directly carried by complement CB" of ring R", that is, complement CB" is appropriately perforated to provide opening 60 in which head HS" of the screw 37" is effectively anchored. As in the case of the earlier described embodiments, screw or threaded member 37" cooperates with the resilient lips 36" of keeper or bridge 17" to hold the complements CA" and CB" or ring sections fully closed and locked.

In all of the embodiments disclosed, the handle may be said to comprise juxtapositioned inverted U-shaped ring sections after folding the ring about its webs and after retaining such sections closed and in juxtaposition. However, the inner margins such as 20 and 21 and outer margins such as 33 and 34 of the spaced ring sections CA and CB in part constitute spaced inner and outer rims about which lips 12, and outer margins 13 and 14 are folded. Also for purposes of definition the cover or wrapper may be considered as a closed band secured to the outer convexed surfaces of the ring sections and having its inner and outer margins secured to the concaved surfaces of such sections.

As many changes could be made in the above set forth embodiments and many widely different embodiments could be devised without departing from the scope thereof, it is intended that all matter contained in the above description and as shown in the accompanying drawings shall be interpreted as illustrative and not in a limiting sense.

I claim:

1. As a new article of manufacture for a handle, comprising a one piece substantially ring shaped member embodying a pair of spaced ring sections adapted to be shifted towards each other and having spaced exteriorly convex surfaces and spaced internally concaved surfaces, spaced web means intermediate said sections and integral therewith, bridge means integral with and extending laterally from the upper margin of one of said sections and outside the latter and adapted to be turned adjacent the confluence of said bridge means and said upper margin within and transversely of said last mentioned section, said last mentioned section having means for holding said bridge means within and transversely of said last mentioned section, and said bridge means and the other section of said pair having cooperating means to hold said sections closed and in juxtaposition.

2. As a new article of manufacture for a handle, comprising; a one piece substantially ring shaped member embodying a pair of spaced ring sections adapted to be shifted towards each other and having spaced exteriorly convex surfaces and spaced internally concaved surfaces, spaced web means intermediate said sections and integral therewith, bridge means integral with and extending laterally from the upper margin of one of said sections and outside the latter and adapted to be turned adjacent the confluence of said bridge means and said upper margin within and transversely of said last mentioned section, said last mentioned section having means for holding said keeper means within and transversely of said last mentioned section, and means fixedly carried by the other section of said pair and embodying shank means for cooperating with said bridge means to hold said sections in juxtaposition and closed pursuant to folding of said sections towards each other about said web means.

3. As a new article of manufacture for a handle, comprising; a one piece substantially ring shaped member embodying a pair of spaced ring sections adapted to be shifted towards each other and having spaced exteriorly convex surfaces and spaced internally concaved surfaces, spaced web means intermediate said sections and integral therewith, bridge means comprising a medial portion and laterally extending wings foldable substantially normal to said medial portion, said medial portion being integral with and extending laterally from the upper margin of one of said sections and outside the latter and adapted to be turned adjacent the confluence of said medial portion and said upper margin within and transversely of said last mentioned section to arrange said wings against the concaved surface of the latter, said last mentioned section having means for holding said bridge means within and transversely of said last mentioned section, and said medial portion and other section of said pair having cooperating means to hold said sections closed and in juxtaposition.

4. As a new article of manufacture for a handle, comprising; a one piece substantially ring shaped member embodying a pair of spaced ring sections adapted to be shifted towards each other and having spaced exteriorly convex surfaces and spaced internally concaved surfaces, spaced web means intermediate said sections and integral therewith, bridge means comprising a medial portion having an aperture and spaced resilient lips leading to said aperture and having laterally extending wings foldable substantially normal to said medial portion, said medial portion being integral with and extending laterally from the upper margin of one of said sections and outside the latter and adapted to be turned adjacent the confluence of said medial portion and said upper margin within and transversely of said last mentioned section to arrange said wings against the concaved surface of the latter, said last mentioned section having means for holding said bridge means within and transversely of said last mentioned section, and means carried by the other section of said pair and receivable into said aperture to cooperate with said lips to hold said sections closed and in juxtaposition.

5. As a new article of manufacture for a handle, comprising; a one piece substantially ring shaped member embodying a pair of spaced ring sections adapted to be shifted towards each other and having spaced exteriorly convex surfaces and spaced internally concaved surfaces, spaced web means intermediate said sections and integral therewith, bridge means comprising a medial portion and having laterally extending wings foldable substantially normal to said medial portion, said medial portion being integral with and extending laterally from the upper margin of one of said sections and outside the latter and adapted to be turned adjacent the confluence of said medial portion and said upper margin within and transversely of said last mentioned section to arrange said wings against the concaved surface of the latter, said last mentioned section having means for holding said bridge means within and transversely of said last mentioned section, a shank carried by said medial portion, and the other section of said pair having means cooperating with said shank to hold said sections closed and in juxtaposition.

6. As a new article of manufacture for a handle, comprising; a one piece substantially ring shaped member embodying a pair of spaced ring sections adapted to be shifted towards each other and having spaced exteriorly convex surfaces and spaced internally concaved surfaces, spaced web means intermediate said sections and integral therewith, bridge means comprising a medial portion including a terminal portion and having laterally extending wings foldable substantially normal to said medial portion, said medial portion being integral with and extending laterally from the upper margin of one of said sections and outside the latter and adapted to be turned adjacent the confluence of said medial portion and said upper margin within and transversely of said last mentioned section to arrange said wings against the concaved surface of the latter, said last mentioned section having a slot for receiving said terminal portion to hold said bridge means within and transversely of said last mentioned section, and said medial portion and other section of said pair including means for holding said sections closed and in juxtaposition.

7. As a new article of manufacture for a handle, comprising; a one piece substantially ring shaped member embodying a pair of spaced ring sections adapted to be shifted towards each other and having spaced exteriorly convex surfaces and spaced internally concaved surfaces, spaced web means intermediate said sections and integral therewith, bridge means comprising a medial portion including a terminal portion and having laterally extending wings foldable substantially normal to said medial portion, said medial portion being integral with and extending laterally from the upper margin of one of said sections and outside the latter and adapted to be turned adjacent the confluence of said medial portion and said upper margin within and transversely of said last mentioned section to arrange said wings against the concaved surface of the latter, said last mentioned section having a lug for cooperating with said terminal portion to hold said bridge means within and transversely of said last mentioned section, and said medial portion and other section of said pair including cooperating means for holding said sections closed and in juxtaposition.

8. As a new article of manufacture for a handle, comprising; a one piece substantially ring shaped member embodying a pair of spaced ring sections adapted to be shifted towards each other and defining a central opening and having spaced exteriorly convex surfaces and spaced internally concaved surfaces, each of said sections having spaced inner and outer rims, spaced web means intermediate said sections and integral therewith, a pair of spaced carrier means extending from said inner rims into said opening and comprising spaced medial portions integral with said inner rims, said medial portions adapted to be swung about said inner rims into said ring sections, the medial portion of one of said carrier means having an aperture and spaced resilient lips, the medial portion of the other carrier means of said pair of carrier means having a shank anchored thereto, and said ring sections having means near said outer rims for staying said medial portions within said ring sections pursuant to positioning of said medial portions between said rims.

9. As a new article of manufacture for a handle, comprising; a one piece substantially ring shaped member embodying a pair of spaced ring sections adapted to be shifted towards each other and defining a central opening and having spaced exteriorly convex surfaces and spaced internally concaved surfaces, each of said sections having spaced inner and outer rims, spaced web means intermediate said sections and integral therewith, a pair of spaced carrier means extending from said inner rims into said opening and comprising spaced medial portions integral with said inner rims, said medial portions adapted to be swung about said inner rims into said ring sections, said medial portions having free terminals, the medial portion of one of said carrier means having an aperture and spaced resilient lips, the medial portion of the other carrier means of said pair of carrier means having a shank anchored thereto, and said ring sections having spaced slots near said outer rims for receiving said terminal portions to stay said medial portions within said ring sections pursuant to positioning of said medial portions between said rims.

10. As a new article of manufacture for a handle, comprising; a one piece substantially ring shaped member embodying a pair of spaced ring sections adapted to be shifted towards each other and defining a central opening and having spaced exteriorly convex surfaces and spaced internally concaved surfaces, each of said sections having spaced inner and outer rims, spaced web means intermediate said sections and integral therewith, a pair of spaced carrier means extending from said inner rims into said opening and comprising spaced medial portions integral with said inner rims and having laterally extending wings foldable substantially normal to said medial portions, said medial portions adapted to be swung about said inner rims into said ring sections, said medial portions having free terminals, the medial portion of one of said carrier means having an aperture and spaced resilient lips, the medial portion of the other carrier means of said pair of carrier means having a shank anchored thereto, and spaced lugs extending from said outer rims and foldable thereover to cooperate with said free portions to stay said medial portions within said ring sections pursuant to positioning of said medial portions between said rims.

11. As a new article of manufacture for a handle, comprising; a one piece substantially ring shaped member embodying a pair of spaced ring sections adapted to be shifted towards each other and defining a central opening and having spaced exteriorly convex surfaces and spaced internally concaved surfaces, each of said sections having spaced inner and outer rims, spaced web means intermediate said sections and integral therewith, a pair of spaced carrier means extending from said inner rims into said opening and comprising spaced medial portions having their outer ends integral with said inner rims and having laterally extending wings foldable substantially normal to said medial portions, said medial portions adapted to be swung about said inner rims into said ring sections to arrange said wings adjacent said concaved surfaces, the medial portion of one of said carrier means having an aperture and spaced resilient lips, the medial portion of the other carrier means of said pair of carrier means having a threaded shank anchored thereto, and means carried by said outer rims for staying said medial portions within said ring sections pursuant to positioning of said medial portions between said rims.

12. A hollow handle, comprising; a one piece substantially ring shaped member embodying a pair of ring sections adapted to be shifted towards each other and each having spaced inner and outer rims and having spaced exteriorly convexed surfaces and spaced internally concaved surfaces, spaced web means intermediate said sections and integral therewith, a flexible wrapper having a centrally arranged opening and defining a closed band secured to said convexed surfaces and having an outer margin turned over said outer rims and secured against said concaved surfaces and having an inner interrupted margin turned into said opening and over said inner rims and secured against said concaved surfaces adjacent said opening, said wrapped ring shaped member being foldable along said web means to define said pair of ring sections, bridge means within and extending transversely of one of said sections and integral with one of said rims thereof, said last mentioned section having means for retaining said bridge means within said last mentioned section, threaded projecting means at least in part within and carried by the other section of said pair intermediate the spaced inner and outer rims thereof, and said bridge means having means for receiving and interlocking with said projecting means to hold said wrapped ring sections closed and in juxtaposition.

13. A hollow handle, comprising; a one piece substantially ring shaped member embodying a pair of ring sections adapted to be shifted towards each other and each having spaced inner and outer rims and having spaced exteriorly convexed surfaces and spaced internally concaved surfaces, spaced web means intermediate said sections and integral therewith, a flexible wrapper having a centrally arranged opening and defining a closed band secured to said convexed surfaces and having an outer margin turned over said outer rims and secured against said concaved surfaces and having an inner interrupted margin turned into said opening and over said inner rims and secured against said concaved surfaces adjacent said opening, said wrapped ring shaped member being foldable along said web means to define said pair of ring sections, spaced bridge means within and extending transversely of said sections and integral with the inner rims thereof, said sections having means for retaining said bridge means within said sections, threaded projecting means carried by the bridge means of one of said sections, and said bridge means of said other section of said pair having means for receiving and interlocking with said projecting means to hold said wrapped ring sections closed and in juxtaposition.

14. A hollow handle, comprising; a one piece substantially ring shaped member embodying a pair of ring sections adapted to be shifted towards each other and each having spaced inner and outer rims and having spaced exteriorly convexed surfaces and spaced internally concaved surfaces, spaced web means intermediate said sections and integral therewith, a flexible wrapper having a centrally arranged opening and defining a closed band secured to said convexed surfaces and having an outer margin turned over said outer rims and secured against concaved surfaces and having an inner interrupted margin turned into said opening and over said inner rims and secured against said concaved surfaces adjacent said opening, said wrapped ring shaped member being foldable along said web means to define said pair of ring sections, spaced bridge means wtihin and extending transversely of said sections and integral with the inner rims thereof, said sections adjacent said outer rims having spaced slots for receiving and retaining said bridge means within said sections, threaded means carried by the bridge means of one of said sections of said pair, and said bridge means of the other section of said pair having means for interlocking with said threaded means to hold said wrapped ring sections closed and in juxtaposition.

15. A hollow handle, comprising; a one piece substantially ring shaped member embodying a pair of ring sections adapted to be shifted towards each other and each having spaced inner and outer rims and having spaced exteriorly convexed surfaces and spaced internally concaved surfaces, spaced web means intermediate said sections and integral therewith, a flexible wrapper having a centrally arranged opening and defining a closed band secured to said convexed surfaces and having an outer margin turned over said outer rims and secured against said concaved surfaces and having an inner interrupted margin turned into said opening and over said inner rims and secured against said concaved surfaces adjacent said opening, said wrapped ring shaped member being foldable along said web means to define said pair of ring sections, spaced bridge means within and extending transversely of said sections and integral with the inner rims thereof, spaced ears projecting from said bridge means to cooperate with said concaved surfaces to preclude sagging of said bridge means, said sections having means cooperating with said bridge means to hold the latter within said sections and said ears against said concaved surfaces, threaded projecting means carried by the bridge means of one of said sections of said pair, and said bridge means of the other section of said pair having means for interlocking with said projecting means to hold said wrapped ring sections closed and in juxtaposition.

16. A hollow handle, comprising; a one piece substantially ring shaped member embodying a pair of ring sections adapted to be shifted towards each other and each having spaced inner and outer rims and having spaced exteriorly convexed surfaces and spaced internally concaved surfaces, spaced web means intermediate said sections and integral therewith, a flexible wrapper having a centrally arranged opening and defining a closed band secured to said convexed surfaces and having an outer margin turned over said outer rims and secured against said concaved surfaces and having an inner interrupted margin turned into said opening and over said inner rims and secured against said concaved surfaces adjacent said opening, said wrapped ring shaped member being foldable along said web means to define said pair of ring sections, spaced bridge means within and extending transversely of said sections and integral with the inner rims thereof, spaced lugs integral with said outer rims and disposed within said sections and cooperating to retain said bridge means within said sections, threaded means carried by the bridge means of one of said sections of said pair, and said bridge means of the other section of said pair having means for interlocking with said threaded means to hold said wrapped ring sections closed and in juxtaposition.

References Cited in the file of this patent

UNITED STATES PATENTS

| | | |
|---|---|---|
| 2,528,831 | Jaffe | Nov. 7, 1950 |
| 2,672,963 | Epton | Mar 23, 1954 |